US009400405B2

(12) United States Patent
Bastani et al.

(10) Patent No.: US 9,400,405 B2
(45) Date of Patent: Jul. 26, 2016

(54) SHADOW CASTING ALIGNMENT TECHNIQUE FOR SEAMLESS DISPLAYS

(71) Applicant: Google Inc., Mountain View, CA (US)

(72) Inventors: Behnam Bastani, San Jose, CA (US); Peyman Milanfar, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 14/254,311

(22) Filed: Apr. 16, 2014

(65) Prior Publication Data

US 2015/0300812 A1    Oct. 22, 2015

(51) Int. Cl.
*G02F 1/1333* (2006.01)
*G01B 11/14* (2006.01)
*G01B 11/27* (2006.01)
*G02F 1/13* (2006.01)

(52) U.S. Cl.
CPC ............ *G02F 1/13336* (2013.01); *G01B 11/14* (2013.01); *G01B 11/272* (2013.01); *G02F 1/1309* (2013.01); *G02F 2001/133354* (2013.01); *G09G 2320/0693* (2013.01)

(58) Field of Classification Search
None
See application file for complete search history.

(56) References Cited

U.S. PATENT DOCUMENTS

| | | | |
|---|---|---|---|
| 5,729,245 A * | 3/1998 | Gove ..................... | G09G 3/002 345/84 |
| 5,847,784 A | 12/1998 | Finnila et al. | |
| 5,889,568 A * | 3/1999 | Seraphim ............ | G02F 1/13336 349/1 |
| 5,969,756 A * | 10/1999 | Buckley ................. | H04N 17/04 348/190 |
| 6,204,895 B1 * | 3/2001 | Nakamura ........ | G02F 1/133526 349/187 |
| 7,145,611 B2 | 12/2006 | Dubin et al. | |
| 7,400,439 B2 | 7/2008 | Holman | |
| 8,419,496 B1 * | 4/2013 | Smith ................... | G02F 1/1333 445/25 |
| 8,665,519 B2 * | 3/2014 | Bell ....................... | G02B 5/201 349/106 |
| 8,876,316 B2 * | 11/2014 | Lu .......................... | G09F 13/04 362/97.1 |
| 9,223,536 B1 * | 12/2015 | Bastani ................. | G06F 3/1423 |
| 2002/0008697 A1 | 1/2002 | Deering | |
| 2002/0027608 A1 | 3/2002 | Johnson et al. | |
| 2002/0118321 A1 | 8/2002 | Ge | |

(Continued)

OTHER PUBLICATIONS

PCT/US2015/019018—PCT International Search Report and Written Opinion, mailed May 27, 2015 (10 pages).

*Primary Examiner* — Gordon J Stock, Jr.
(74) *Attorney, Agent, or Firm* — Blakely Sokoloff Taylor & Zafman LLP (57) ABSTRACT

A method for aligning optical layers of a multi-layer display includes displaying a dark screen image on each of a plurality of transmissive pixel arrays separated from each other by spacing regions. The transmissive pixel arrays are disposed on a display layer of the multi-layer display. The display layer is illuminated with a plurality of illumination sources of an illumination layer disposed behind the display layer. Each of the illumination sources corresponds to one of the transmissive pixel arrays to illuminate the corresponding one of the transmissive pixel arrays. An illumination pattern is cast onto a screen layer disposed in front of the display layer. The illumination pattern includes bright regions due to overlapping illumination cast from adjacent ones of the transmissive pixel arrays. The bright regions of the illumination pattern cast onto the screen layer are analyzed to identify misalignments between the display layer and the illumination layer.

20 Claims, 8 Drawing Sheets

(56) References Cited

U.S. PATENT DOCUMENTS

| | | |
|---|---|---|
| 2004/0085519 A1 | 5/2004 | Dubin et al. |
| 2007/0081130 A1* | 4/2007 | May .................... H04N 5/7416 353/85 |
| 2007/0103652 A1 | 5/2007 | Nijim et al. |
| 2007/0115440 A1* | 5/2007 | Wiklof .................. G03B 21/14 353/69 |
| 2008/0259223 A1 | 10/2008 | Read et al. |
| 2011/0304597 A1 | 12/2011 | Hyatt |
| 2012/0169684 A1* | 7/2012 | Sultan .................. H04N 9/3147 345/207 |

* cited by examiner

SHADOW CASTING ALIGNMENT TECHNIQUE FOR SEAMLESS DISPLAYS

TECHNICAL FIELD

This disclosure relates generally to optical displays, and in particular but not exclusively, relates to seamless tiling of optical displays.

BACKGROUND INFORMATION

Large wall displays can be prohibitively expensive as the cost to manufacture display panels rises exponentially with monolithic display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

Figure 1A:
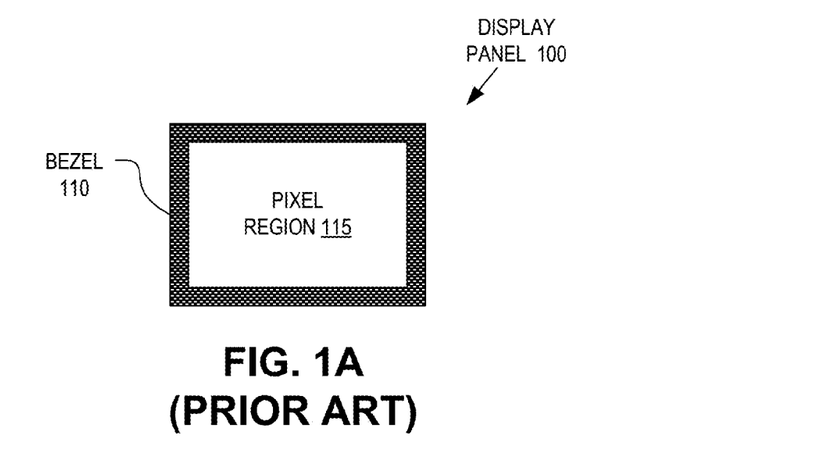
FIGS. 1A & 1B (PRIOR ART) illustrate conventional display panel tiling.
Figure 1B:
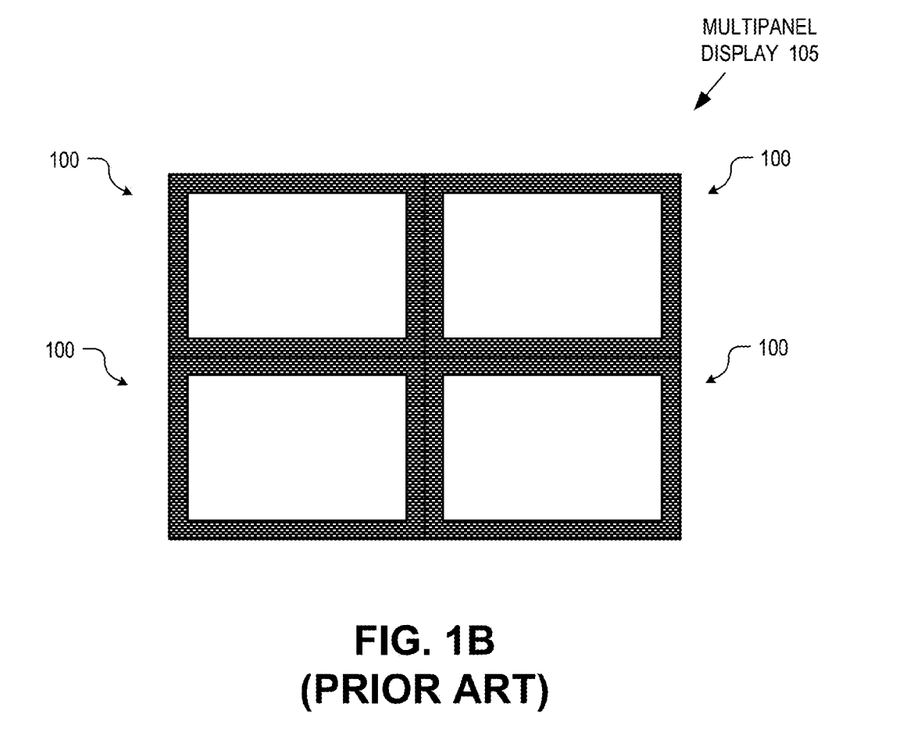

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall composite image collectively displayed by multi-panel display 105. While multi-panel display 105 can reduce costs, visually it has a major drawback. Each display panel 100, includes a bezel 110 around its periphery. Bezel 110 is a mechanical structure that houses pixel region 115 in which the display pixels are disposed. In recent years, manufactures have reduced the thickness of bezel 110 considerably to less than 2 mm. However, even these thin bezel trims are still very noticeable to the naked eye, distract the viewer, and otherwise detract from the overall visual experience. To achieve a high quality multi-tile display, the transition between image portions should be substantially imperceptible from a typical viewing distance with a high degree of alignment.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method for aligning optical layers of a multi-layer display are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
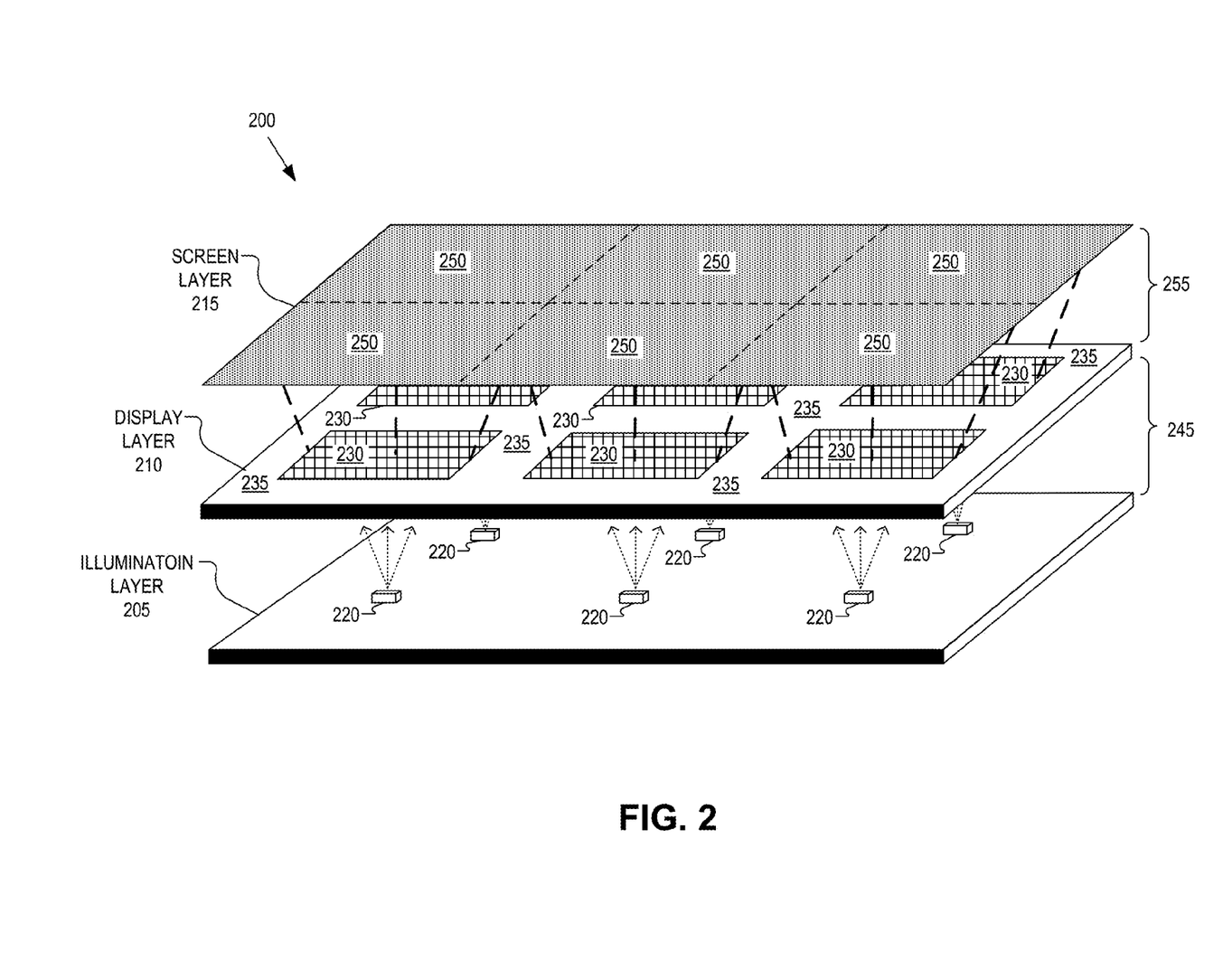
FIG. 2 is a perspective view illustrating functional layers of a multi-layer display tile, in accordance with an embodiment of the disclosure.
Figure 3A:
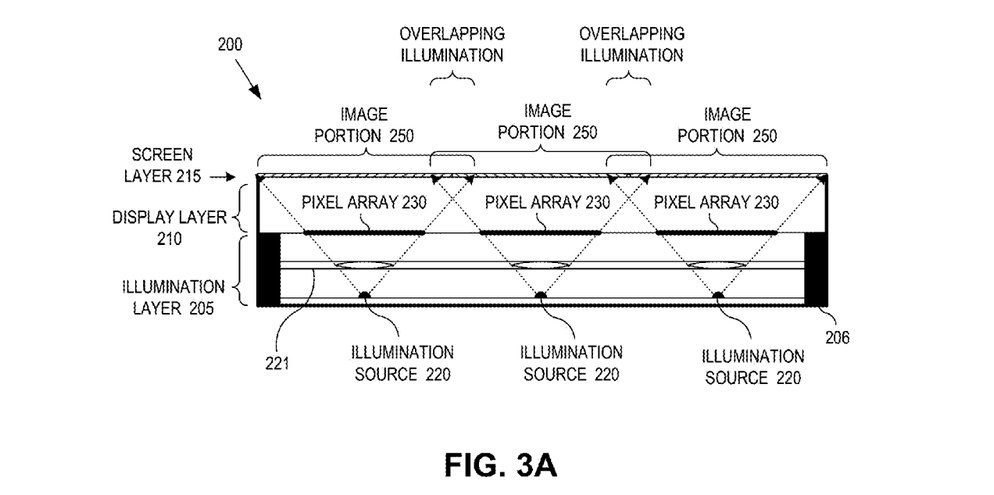
FIG. 3A is a cross-sectional view of functional layers of a multi-layer display tile illustrating overlapping illumination between image portions, in accordance with an embodiment of the disclosure.

FIGS. 2 and 3A illustrate functional layers of a multi-layer display tile 200, in accordance with an embodiment of the disclosure. FIG. 2 is a perspective view of the layers of display tile 200 while FIG. 3A is a cross-section view of the same. The illustrated embodiment of display tile 200 includes an illumination layer 205, a display layer 210, and a screen layer 215. The illustrated embodiment of illumination layer 205 includes an array of illumination sources 220 and a lensing layer 221 (illustrated in FIG. 3A only for clarity). The illustrated embodiment of display layer 210 includes transmissive pixel arrays 230 separated from each other by spacing regions 235. The illustrated embodiment of screen layer 215 is divided into regions for displaying image portions 250 of an overall unified image. Multi-layer display tile 200 is made up of a plurality of pixlets, which each includes an illumination source 220, pixel array 230, and a screen region for displaying an image portion 250 aligned within a column through multi-layer display tile 200.

In the illustrated embodiment, each illumination source 220 is aligned under a corresponding pixel array 230 to illuminate a backside of the corresponding pixel array with lamp light. Illumination sources 220 may be implemented as independent light sources (e.g., color or monochromatic LEDs, quantum dots, etc.) that emit light with a defined angular spread or cone to fully illuminate their corresponding transmissive pixel array 230 residing above on display layer 210. The illumination layer 205 and display layer 210 are separated from each other by a fixed distance 245 (e.g., 8 mm).

This separation may be achieved using a transparent intermediary (e.g., glass or plastic layers) and may further include one or more lensing layers 221 (including lenses, apertures, beam confiners, etc.) to control or manipulate the angular extent and cross-sectional shape of the lamp light emitted from illumination sources 220. In one embodiment, an illumination controller may be coupled to illumination sources 220 to control their illumination intensity. Illumination layer 205 may include a substrate upon which illumination sources 220 are disposed and/or include a mechanical structure to facilitate fine lateral X-Y adjustments of the individual positions of each illumination source 220.

Transmissive pixel arrays 230 are disposed on the display layer 210 and each includes an array of transmissive pixels (e.g., 100 pixels by 100 pixels). In one embodiment, the transmissive pixels may be implemented as backlit liquid crystal pixels. Each transmissive pixel array 230 is an independent display array that is separated from adjacent transmissive pixel arrays 230 by spacing regions 235 on display layer 210. The internal spacing regions 235 that separate adjacent pixel arrays 230 from each other may be twice the width as the perimeter spacing regions 235 that separate a given pixel array 230 from an outer edge of display layer 210. In one embodiment, the internal spacing regions 235 have a width of 4 mm while the perimeter spacing regions 235 have a width of 2 mm. Of course, other dimensions may be implemented.

As illustrated, transmissive pixel arrays 230 are spaced across display layer 210 in a matrix with spacing regions 235 separating each transmissive pixel array 230. In one embodiment, transmissive pixel arrays 230 each represent a separate and independent array of display pixels (e.g., backlit LCD pixels). Spacing region 235 are significantly larger than the inter-pixel separation between pixels of a given transmissive pixel array 230. Spacing regions 235 provide improved flexibility for routing signal lines or the inclusion of additional circuitry, such as a display controller. Spacing regions 235 that reside along the exterior perimeter of display layer 210 also provide space for the bezel trim 206 of display tile 200. Bezel trim 206 operates as the sides of the housing for display tile 200. The spacing regions 235 that reside along the exterior perimeter also provide space for power and/or communication ports.

Although FIG. 2 illustrates display layer 210 as including six transmissive pixel arrays 230 arranged into two rows and three columns, it should be appreciated that various implementations of display tile 200 may include more or less transmissive pixel arrays 230 organized into differing combinations of rows and columns. As such, in embodiments having a one-to-one ratio of illumination sources 220 to tarnsmissivle pixel arrays 230, the number and layout of illumination sources 220 on illumination layer 205 may also vary. While FIG. 2 does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, a protective layer over screen layer 215, or otherwise.

Figure 3B:
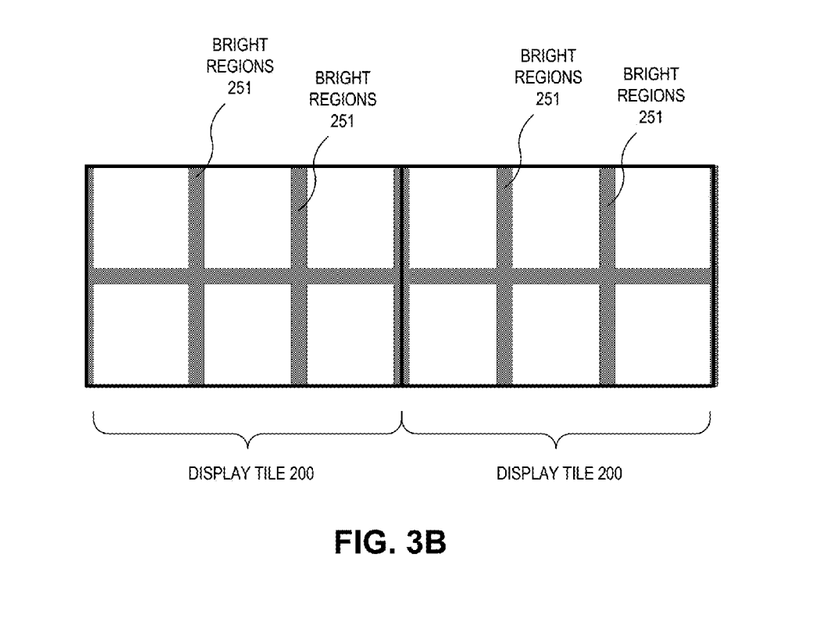
FIG. 3B is a plan view of two display tiles illustrating how a large seamless display including multiple display tiles can be achieved, in accordance with an embodiment of the disclosure.

Transmissive pixel arrays 230 are switched under control of a display controller to modulate the lamp light and project image portions 250 onto a backside of screen layer 215. In one embodiment, screen layer 215 is fabricated of a matte material suitable for rear projection that is coated onto a transparent substrate that provides mechanical support. Image portions 250 collectively blend together on screen layer 215 to present a unified image to a viewer from the viewing side of screen layer 215 that is substantially without seams. In other words, the images created by transmissive pixel arrays 230 are magnified as they are projected across separation 255 (e.g., 2 mm) between display layer 210 and screen layer 215. The image portions 250 are magnified enough to extend over and cover spacing regions 235 forming a seamless unified image. The magnification factor is dependent upon separation 255 and the angular spread of the lamp light emitted by illumination sources 220. In one embodiment, image portions 250 are magnified by a factor of approximately 1.5. Not only does the unified image cover the internal spacing regions 235, but also covers the perimeter spacing regions 235. As such, display tile 200 may be positioned adjacent to other display tiles 200 and communicatively interlinked to form larger composite seamless displays, in which case the unified image generated by a single display tile becomes a sub-portion of a multi-tile unified image (e.g., see FIG. 3B).

FIG. 3A is a cross-sectional view of the multiple functional layers of display tile 200. As illustrated, the position and beam spread of illumination sources 220 relative to transmissive pixel arrays 230 and screen layer 215 are designed such that the transmissive pixel arrays 230 project or cast image portions 250 that overlap with those of adjacent neighbors. These overlapping areas of image portions 250 projected onto the backside of screen layer 215 are referred to as overlap regions.

The overlap regions may be several pixels wide (e.g., two to ten image pixels wide, though more or less overlap may be implemented) and provide a region on screen layer 215 where adjacent transmissive pixel arrays 230 (and corresponding illumination sources 220) both contribute light onto screen layer 215. While careful control over manufacturing tolerances can provide fair alignment between adjacent image portions 250, these seams may not be entirely invisible without significant manufacturing expense. Accordingly, techniques described herein use overlapping illumination (see FIGS. 3A and 3B) cast from adjacent transmissive pixel arrays 230 to cover spacing regions 235 and aid in physical alignment of the optical components. The overlapping illumination enables the use of various blending techniques to seamlessly stitch together adjacent image portions 250 into a near seamless unified image. The overlapping illumination cast through adjacent transmissive pixel arrays 230 produces an illumination pattern of bright regions 251. These bright regions 251 can be used for both gross alignment and fine alignment between illumination layers 205 and display layer 210. In particular, the bright regions 251 of the illumination pattern can be analyzed for non-uniformities, such as non-symmetric illumination patterns, to identify misalignments. A uniform (e.g., symmetric) illumination pattern is achieved when a given illumination source 220 and the intervening lens element of lensing layer 221 are optically aligned with their corresponding transmissive pixel array 230. When the optical components of neighboring pixlets are aligned, the illumination pattern cast through display layers 210 is uniform.

Figure 4:
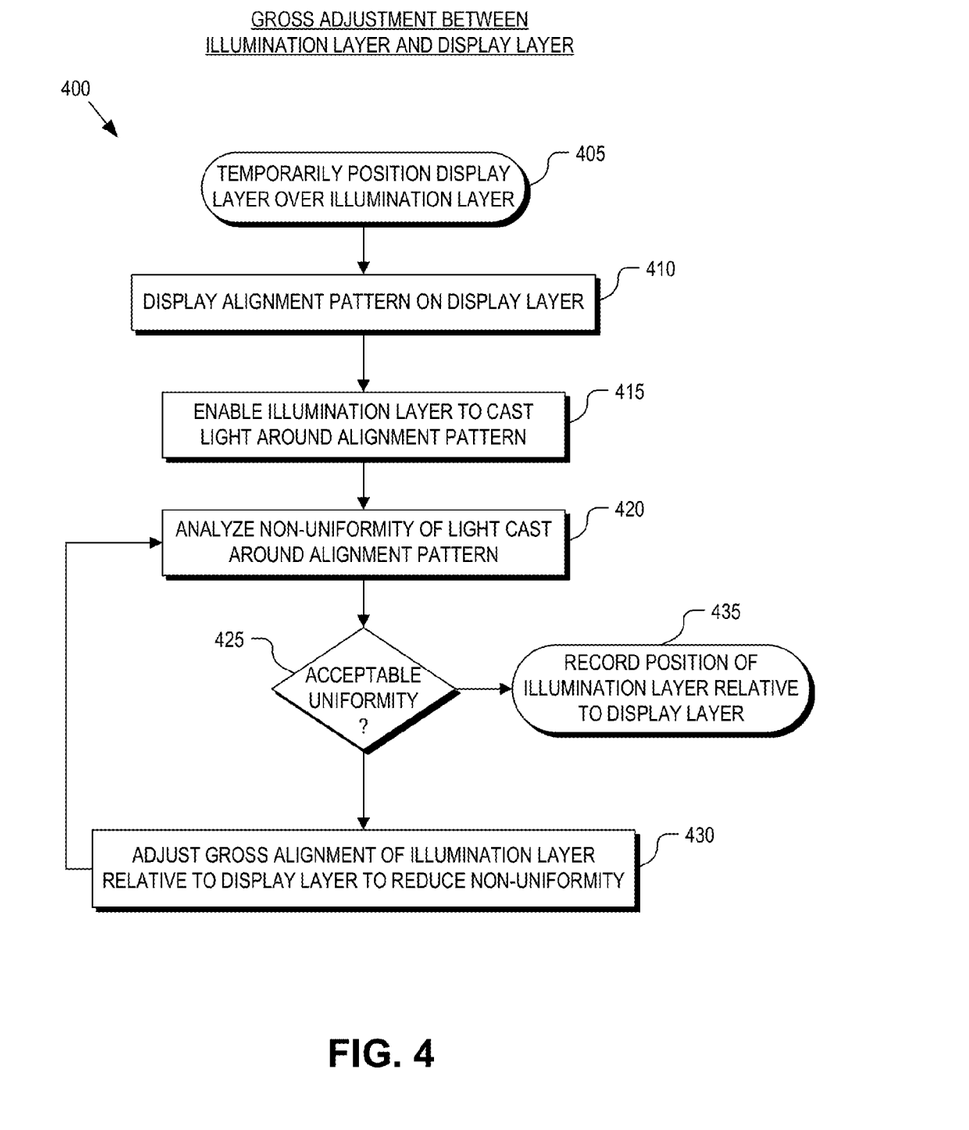
FIG. 4 is a flow chart illustrating a process for gross alignment between an illumination layer and a display layer using a shadow casting technique, in accordance with an embodiment of the disclosure.

FIG. 4 is a flow chart illustrating a process 400 for gross alignment between the components of illumination layer 205 and the components of display layer 210 using a shadow casting technique, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Figure 5A:
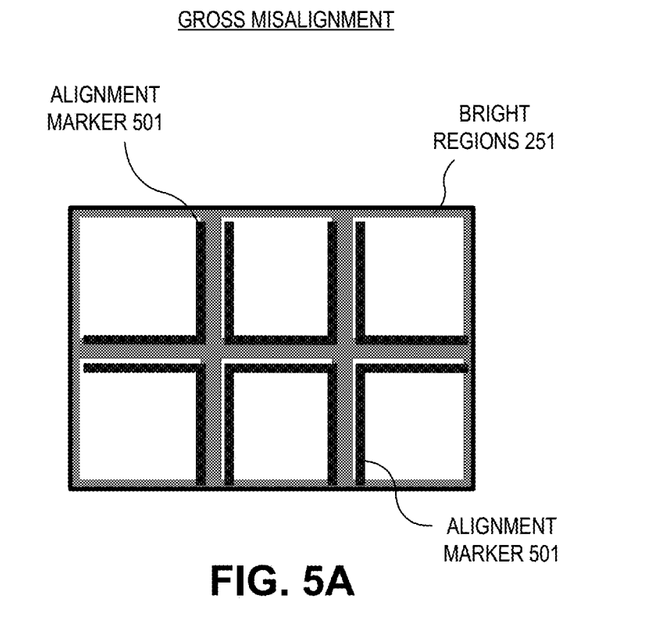
FIGS. 5A and 5B illustrate the use of an alignment pattern during gross alignment, in accordance with an embodiment of the disclosure.
Figure 5B:
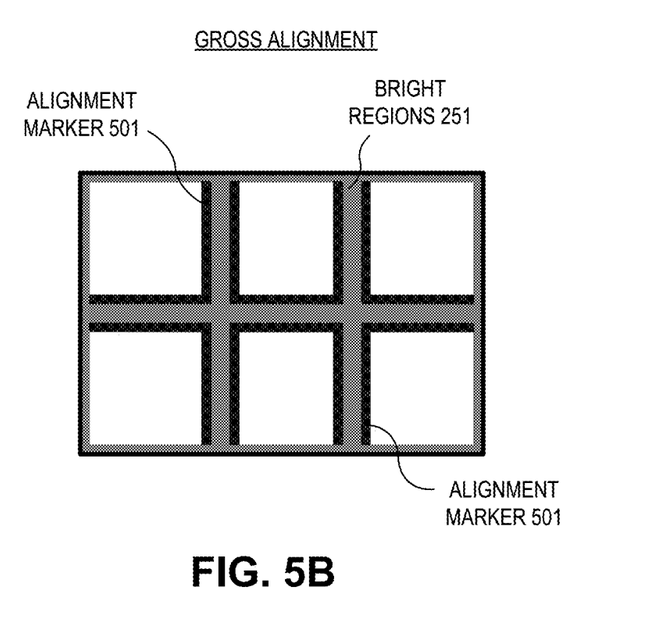

In a process block 405, display layer 210 is temporarily positioned over illumination layer 205 to perform an initial gross alignment between the two layers of multi-layer display tile 200. This initial gross alignment is performed without placing screen layer 215 on top of display layer 210. With illumination layer 205 and display layer 210 temporarily sandwiched together, illumination layer 205 and display layer 210 are powered and display layer 210 is driven with an alignment pattern (process blocks 410 and 415). FIGS. 5A and 5B illustrate an example alignment pattern displayed across multiple transmissive pixel arrays 230, in accordance with an embodiment. As illustrated, the alignment pattern includes alignment markers 501 displayed by each transmissive pixel array 230 to surround the bright regions 251 of the illumination pattern. By analyzing the uniformity (or non-uniformity) of the light cast around the alignment pattern (process block 420), gross alignment between illumination layer 205 and display layer 210 can be determined (decision block 425). For example, if alignment markers 501 from adjacent transmissive pixel arrays 230 do not symmetrically surround their intervening bright region 251 (see FIG. 5A), then a gross misalignment between illumination layer 205 and display layer 210 can be inferred. Correspondingly, if alignment markers 501 do uniformly (e.g., symmetrically) surround their intervening bright regions 251, then gross alignment between illumination layer 205 and display layer 210 can be inferred. The two layers can be adjusted relative to each other (process block 430) until the best uniformity or an acceptable uniformity is achieved (decision block 425). In one embodiment, the adjustments are made along a two dimensional plane (e.g., x and y dimensions). Once gross alignment has been achieved (decision block 425), the relative position of display layer 210 to illumination layer 205 is recorded for future assembly of the given part (process block 435).

Figure 6:
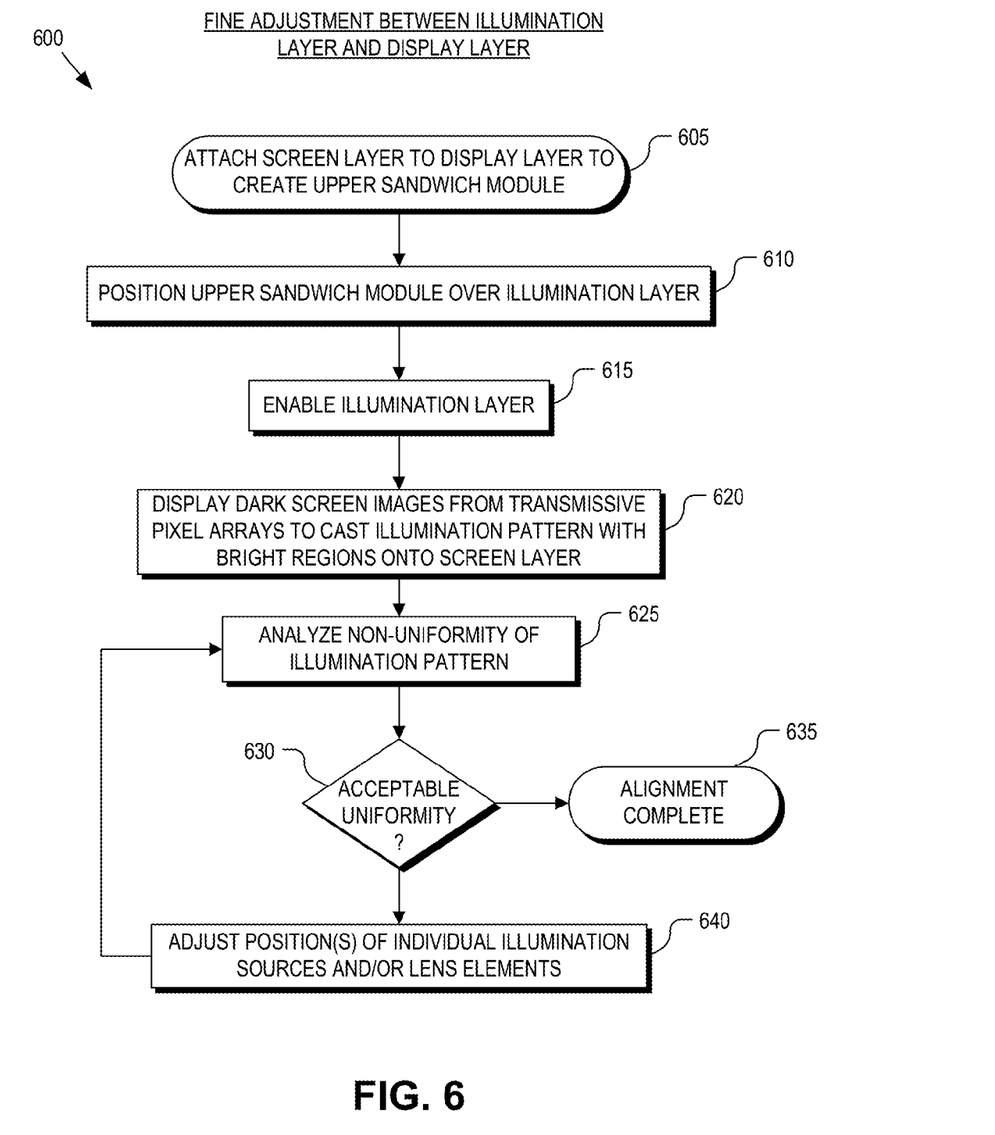
FIG. 6 is a flow chart illustrating a process for fine alignment between an illumination layer and a display layer using a shadow casting technique, in accordance with an embodiment of the disclosure.

FIG. 6 is a flow chart illustrating a process 600 for fine alignment between illumination layer 205 and display layer 210 using a shadow casting technique, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

Process 600 is a fine alignment procedure compared to process 400. Process 400 serves to grossly align the overall illumination layer 205 relative to display layer 210. Process 400 adjusts the position of a carrier substrate, which moves all illumination sources 220 at once. In contrast, process 600 serves to finely align illumination layer 205 relative to display layer 210 by individually adjusting positions of each illumination source 220, and in some embodiments, lens elements of lensing layer 221 may also be individually adjusted and aligned. These adjustments are fine adjustments, such as micron-level displacements.

In a process block 605, screen layer 210 is attached to display layer 210 to create an upper sandwich module. In one embodiment, this attachment may include glue or other mechanical fasteners. In a process block 610, the upper sandwich module is positioned over illumination layer 205. Illumination layer 205 may be positioned according to the gross alignment position determined and recorded in gross alignment process 400. Once assembled, illumination layer 205 is enabled (process block 615) and display layer 210 is driven with a dark screen image such that all transmissive pixel arrays 230 display uniform dark image portions, such as black screen image portions (process block 620).

Figure 7:
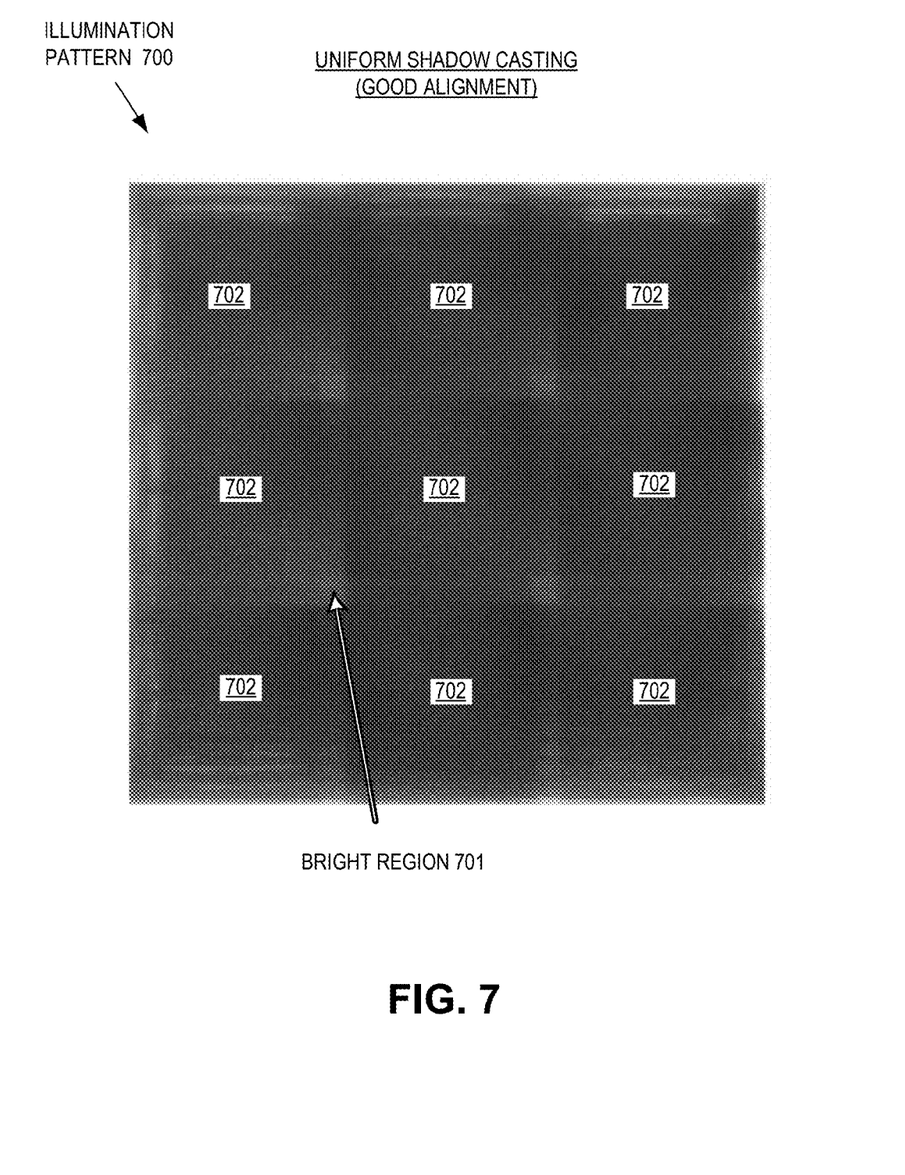
FIG. 7 illustrates an illumination pattern indicative of good alignment with symmetric bright regions, in accordance with an embodiment of the disclosure.
Figure 8:
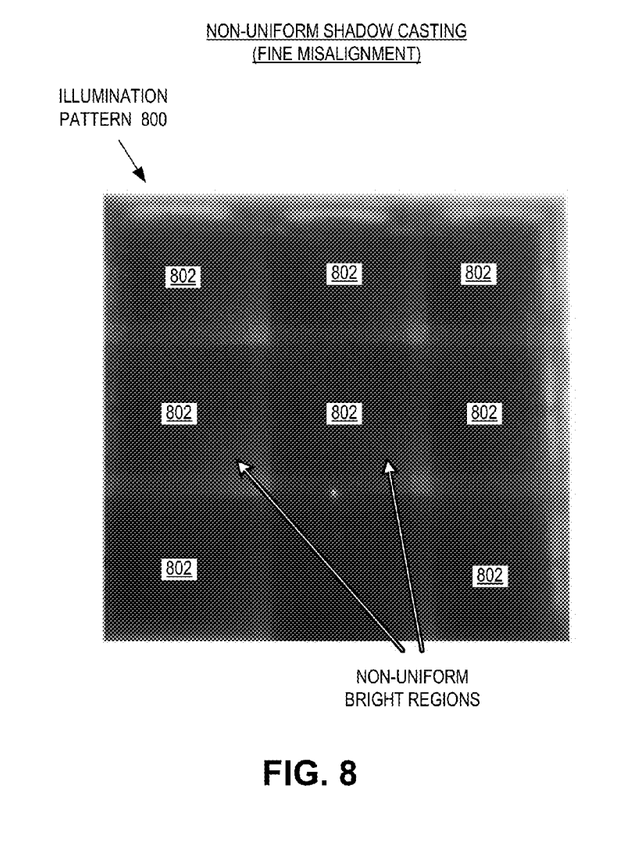
FIG. 8 illustrates an illumination pattern indicative of poor alignment with non-uniformities in the bright regions, in accordance with an embodiment of the disclosure.
Figure 9:
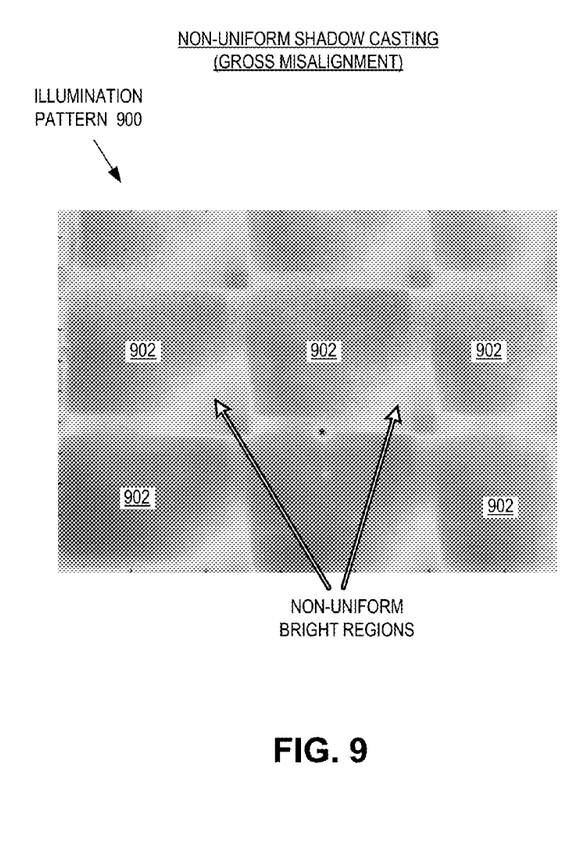
FIG. 9 illustrates an illumination pattern indicative of poor alignment with non-uniformities in the bright regions, in accordance with an embodiment of the disclosure.

These black screen image portions cast shadows onto the backside of screen layer 215 that are surrounded by bright regions at the transitions or seams between image portions (e.g. image portions 250). These shadows and bright regions collectively form an illumination pattern on screen layer 215, which is used for alignment. The shape of these bright regions, or uniformity of the illumination pattern, can be used to individually align the optical components of illumination layer 205. FIGS. 7, 8, and 9 illustrate illumination patterns cast onto screen layer 215 while finely aligning the optical components of illumination layer 205 using shadow casting techniques as described herein. FIG. 7 illustrates an illumination pattern 700 indicative of good alignment while FIGS. 8 and 9 illustrate illumination patterns 800 and 900, respectively, indicative of poor alignment.

In a process block 625, the illumination pattern cast onto screen layer 215 is analyzed for uniformity (or non-uniformity) to determine alignment (or misalignment). If the individual illumination sources 220 and intervening lens elements of lensing layer 221 are correctly aligned with their corresponding transmissive pixel arrays 230, then an illumination pattern similar to illumination pattern 700 is cast onto screen layer 215 (decision block 630). Illumination pattern 700 is uniform, since bright regions 701 form symmetrical transitions between dark image portions 702. In this scenario, alignment would be deemed complete in a process block 635.

However, if the individual illumination sources 220 and/or intervening lens elements of lensing layer 221 are misaligned with their corresponding transmissive pixel arrays 230, then an illumination pattern similar to either illumination patterns 800 or 900 is cast onto screen layer 215 (decision block 630). As illustrated, misalignments cause non-uniform bright regions surrounding dark image portions 802 and 902. The particular non-uniform bright region provides both an indication of which illumination source 220 and/or lens element needs to be adjusted and the direction of the adjustment. Accordingly, in a process block 640, the position of a particular illumination source 220 and/or lens element is adjusted to reduce or eliminate non-uniformities cast onto screen layer 215. These adjustments may include micro position adjustments or nudges of a given illumination source 220 and/or its corresponding lens element on lensing layer 221. Position adjustments to illumination sources 220 and/or lensing layer 221 may continue until the amount or degree of non-uniformities drops below a threshold level (e.g., acceptably uniform) or it is determined that the uniformity of the illumination pattern cannot substantially be further improved.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for aligning optical layers of a multi-layer display, the method comprising:
   displaying a dark screen image on each of a plurality of transmissive pixel arrays separated from each other by spacing regions, the transmissive pixel arrays disposed on a display layer;
   illuminating the display layer with a plurality of illumination sources of an illumination layer disposed behind the display layer, wherein each of the illumination sources corresponds to one of the transmissive pixel arrays to illuminate the corresponding one of the transmissive pixel arrays;
   casting an illumination pattern onto a screen layer disposed in front of the display layer, wherein the illumination pattern includes bright regions due to overlapping illumination cast from adjacent ones of the transmissive pixel arrays; and
   analyzing the bright regions of the illumination pattern cast onto the screen layer to identify misalignments between the display layer and the illumination layer.

2. The method of claim 1, wherein the bright regions are transition regions on the screen layer between image portions cast onto the screen layer by adjacent transmissive pixel arrays on the display layer and corresponding illumination sources on the illumination layer, and wherein the transition regions are disposed over spacing regions on the display layer.

3. The method of claim 2, wherein each transmissive pixel array comprises 1000 display pixels or more, and wherein the overlapping illumination comprises between two and ten image pixels wide on the screen layer.

4. The method of claim 1, wherein analyzing the bright regions of the illumination pattern cast onto the screen layer to identify misalignment comprises analyzing the bright regions to identify non-uniformities in the bright regions.

5. The method of claim 4, wherein non-uniformities in the bright regions comprise non-symmetric bright regions.

6. The method of claim 4, further comprising:
   determining that a given bright region has a non-uniformity that exceeds a threshold level; and
   adjusting a position of at least one of the illumination sources that contributes to casting light onto the given bright region to reduce the non-uniformity.

7. The method of claim 6, further comprising:
   adjusting positions of one or more of the illumination sources until all of the bright regions of the illumination pattern cast onto the screen layer are acceptably uniform.

8. The method of claim 4, further comprising:
   determining that a given bright region has a non-uniformity that exceeds a threshold level; and
   adjusting a position of at least one lens element disposed between the illumination sources and the transmissive pixel arrays to reduce the non-uniformity.

9. The method of claim 1, further comprising:
   positioning the display layer over the illumination layer prior to attaching the screen layer to the display layer;
   displaying an alignment pattern across the transmissive pixel arrays and illuminating the transmissive pixel arrays prior to attaching the screen layer to the display layer; and
   analyzing a non-uniformity of light cast around the alignment pattern to determine a gross alignment of the display layer relative to the illumination layer.

10. The method of claim 9, further comprising:
    adjust alignment of the illumination layer relative to the display layer to reduce the non-uniformity of light cast around the alignment pattern.

11. At least one non-transitory machine-accessible storage medium that provides instructions that, when executed by a machine, will cause the machine to perform operations comprising:
    displaying a dark screen image on each of a plurality of transmissive pixel arrays separated from each other by spacing regions, the transmissive pixel arrays disposed on a display layer of a multi-layer display tile;
    illuminating the display layer with a plurality of illumination sources of an illumination layer disposed behind the display layer, wherein each of the illumination sources corresponds to one of the transmissive pixel arrays to illuminate the corresponding one of the transmissive pixel arrays;
    casting an illumination pattern onto a screen layer disposed in front of the display layer, wherein the illumination pattern includes bright regions due to overlapping illumination cast from adjacent ones of the transmissive pixel arrays; and
    analyzing the bright regions of the illumination pattern cast onto the screen layer to identify misalignments between the display layer and the illumination layer.

12. The non-transitory machine-accessible storage medium of claim 11, wherein the bright regions are transition regions on the screen layer between image portions cast onto the screen layer by adjacent transmissive pixel arrays on the display layer and corresponding illumination sources on the illumination layer, and wherein the transition regions are disposed over spacing regions on the display layer.

13. The non-transitory machine-accessible storage medium of claim 12, wherein each transmissive pixel array comprises 1000 display pixels or more, and wherein the overlapping illumination comprises between two and ten image pixels wide on the screen layer.

14. The non-transitory machine-accessible storage medium of claim 11, wherein analyzing the bright regions of the illumination pattern cast onto the screen layer to identify misalignment comprises analyzing the bright regions to identify non-uniformities in the bright regions.

15. The non-transitory machine-accessible storage medium of claim 14, wherein non-uniformities in the bright regions comprise non-symmetric bright regions.

16. The non-transitory machine-accessible storage medium of claim 14, further providing instructions that, when executed by the machine, will cause the machine to perform further operations, comprising:
    determining that a given bright region has a non-uniformity that exceeds a threshold level; and
    adjusting a position of at least one of the illumination sources that contributes to casting light onto the given bright region to reduce the non-uniformity.

17. The non-transitory machine-accessible storage medium of claim 16, further providing instructions that, when executed by the machine, will cause the machine to perform further operations, comprising:

adjusting positions of one or more of the illumination sources until all of the bright regions of the illumination pattern cast onto the screen layer are acceptably uniform.

18. The non-transitory machine-accessible storage medium of claim 14, further providing instructions that, when executed by the machine, will cause the machine to perform further operations, comprising:

determining that a given bright region has a non-uniformity that exceeds a threshold level; and adjusting a position of at least one lens element disposed between the illumination sources and the transmissive pixel arrays to reduce the non-uniformity.

19. The non-transitory machine-accessible storage medium of claim 11, further providing instructions that, when executed by the machine, will cause the machine to perform further operations, comprising:

positioning the display layer over the illumination layer prior to attaching the screen layer to the display layer;

displaying an alignment pattern across the transmissive pixel arrays and illuminating the transmissive pixel arrays prior to attaching the screen layer to the display layer; and analyzing a non-uniformity of light cast around the alignment pattern to determine a gross alignment of the display layer relative to the illumination layer.

20. The non-transitory machine-accessible storage medium of claim 19, further providing instructions that, when executed by the machine, will cause the machine to perform further operations, comprising:

adjust alignment of the illumination layer relative to the display layer to reduce the non-uniformity of light cast around the alignment pattern.

\* \* \* \* \*